Figure 1:
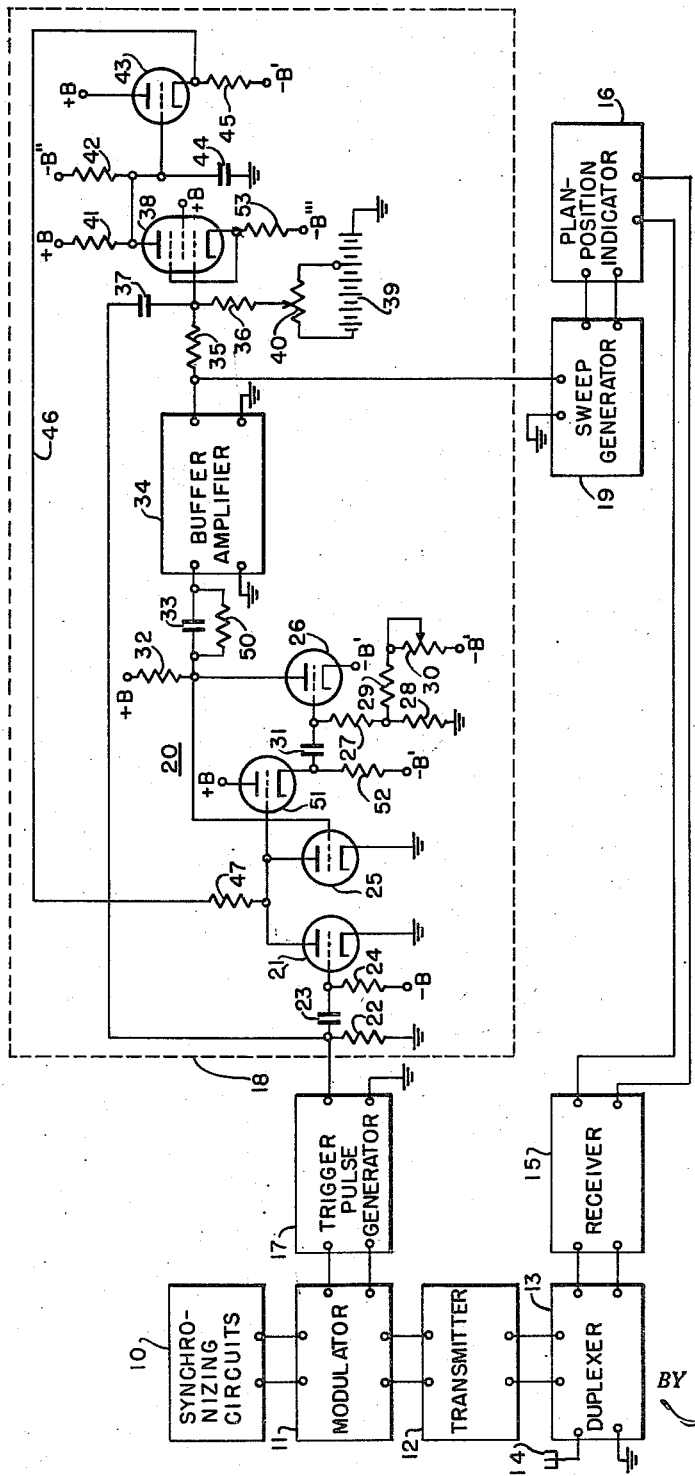

INVENTOR.
JASPER J. OKRENT
BY Lawrence B. Dodds
ATTORNEY

United States Patent Office 2,708,239
Patented May 10, 1955

2,708,239

CONTROL SYSTEM FOR AUTOMATICALLY VARYING THE DURATION OF REPETITIVE PULSES

Jasper J. Okrent, Flushing, N. Y., assignor to Hazeltine Research, Inc., Chicago, Ill., a corporation of Illinois Application September 13, 1951, Serial No. 246,456

8 Claims. (Cl. 250—27)

General

The present invention relates to control systems for automatically varying the duration of repetitive pulses and, more particularly, to such systems of the type which may be utilized as a gating pulse generator system for automatically varying the duration of gating pulses in response to variations in the relative values of the duration of the gating pulses and the period of trigger pulses which synchronize the source of the gating pulses. Such a control system has particular utility in a radar system and, hence, will be described in that environment.

Prior radar systems have commonly utilized a gating pulse generator to control the operation of a sweep generator which supplied a sweep signal for a cathode-ray-tube indicator in certain applications, such as those requiring intermittent sweeping in the indicator. The sweep generator ordinarily supplies the sweep signal during gating intervals determined by the gating pulse generator. During the intervals between sweeps, the gating pulse generator and the sweep generator return to a stable reference operating condition. The gating pulse generator and the sweep generator, however, ordinarily require a predetermined minimum recovery time between sweeps to allow both generators to become stable. Heretofore, some prior radar systems which operated with a high repetition rate and searched long ranges have not allowed sufficient recovery time between sweeps for the stabilization of the gating pulse generator and sweep generator. Hence, under such operating conditions, the display on the cathode-ray-tube indicator may be unstable and subject to erratic movement or, in some cases, a dual display may result. Such displays, of course, are confusing to an operator and, hence, are undesirable.

It is an object of the present invention, therefore, to provide a new and improved control system for automatically varying the duration of repetitive pulses which avoids one or more of the above-mentioned disadvantages of prior systems.

It is another object of the invention to provide a new and improved control system for automatically varying the duration of repetitive pulses by means of which the operation of the gating pulse generator and the sweep generator of a radar indicator may be stabilized under different conditions.

It is still another object of the invention to provide a new and improved control system for automatically varying the durtaion of repetitive pulses by means of which dual displays on a radar cathode-ray-tube indicator may be eliminated.

In accordance with a particular form of the invention, in a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprises a circuit for supplying trigger pulses and a source of repetitive pulses of a variable duration coupled to the supply circuit and having a repetition rate determined by the repetition rate of the trigger pulses. The control system also includes a circuit responsive jointly to the repetitive pulses and the trigger pulses for deriving therefrom a control signal representative of the time interval between the termination of each repetitive pulse and the succeeding trigger pulse. The control system further includes a circuit for applying the control signal to the source of repetitive pulses to vary the duration thereof in response to variations in the aforesaid time interval to maintain that time interval greater than the above-mentioned predetermined minimum time.

For a better understanding of the present invention, together with other and further objects thereof, reference is had to the following description taken in connection with the accompanying drawings, and its scope will be pointed out in the appended claims.

Figure 2:
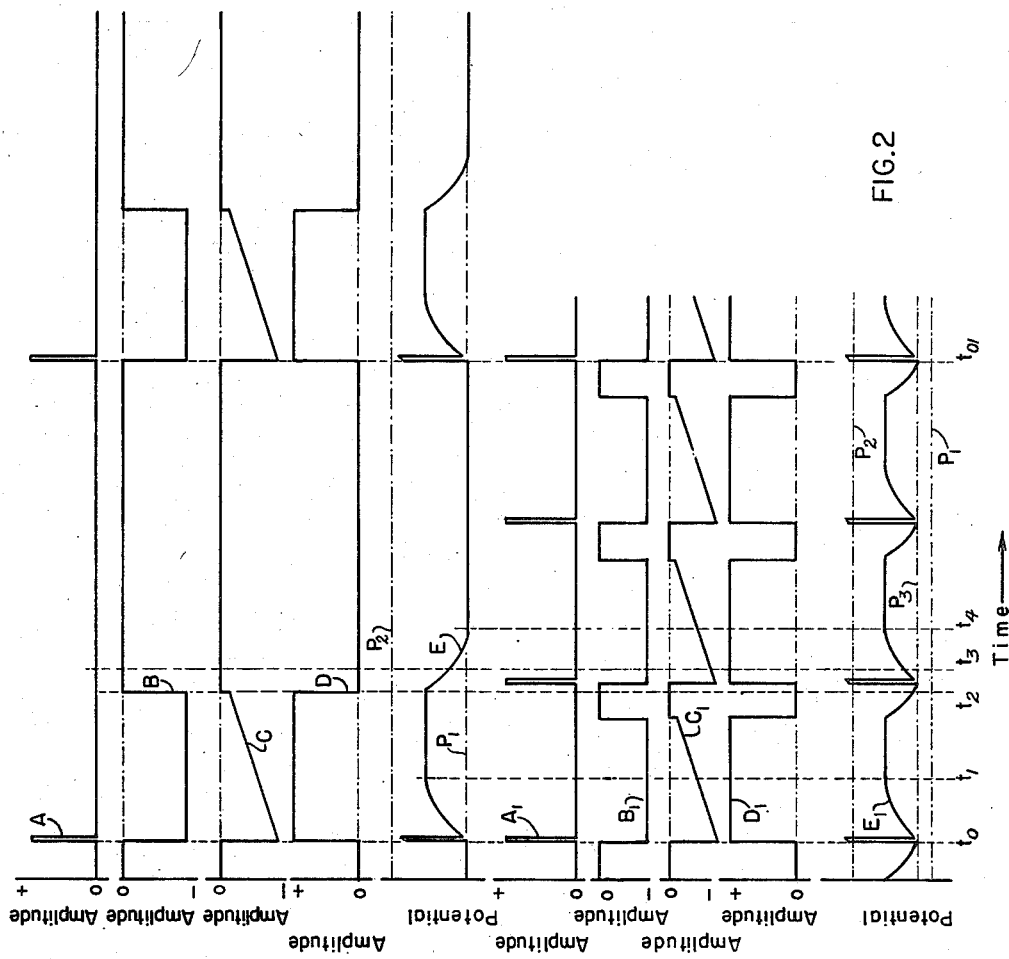

In the accompanying drawings, Fig. 1 is a schematic circuit diagram of a radar system including a control system for automatically varying the duration of repetitive pulses constructed in accordance with a particular form of the invention; and Fig. 2 is a graph representing the output signals of various units of the Fig. 1 radar system to aid in explaining the invention.

General description of Fig. 1 radar system

Referring now more particularly to Fig. 1, there is represented a radar system including a control system for automatically varying the duration of repetitive pulses in accordance with the invention. The radar system comprises the usual synchronizing circuits 10 which may include a suitable repetition rate oscillator and pulse generator circuits well known in the art. The synchronizing circuits 10 are coupled through a modulator 11 of conventional construction to a transmitter 12 for transmitting pulse-modulated radar signals. The transmitter 12 is coupled in a usual manner to an antenna 14 through a duplexer 13 which may be of any suitable type, such as one of the types described in chapter XI of the text "Principles of Radar," second edition, by the Massachusetts Institute of Technology Radar School Staff, McGraw-Hill, 1946. The antenna 14 is also coupled through the duplexer 13 to a receiver 15 of conventional construction for receiving and detecting echo signals intercepted by the antenna 14 and for applying these signals to an input circuit of a plan-position indicator 16 which may comprise a cathode-ray tube.

The radar system also includes a source of trigger pulses comprising a trigger pulse generator 17 for synchronizing a source of repetitive pulses, included in a control system 18 for automatically varying the duration of the repetitive pulses constructed in accordance with the invention and more fully to be described hereinafter. The trigger pulse generator 17 preferably is a so-called "one-shot" multivibrator, such as that described at page 590 of the text "Radio Engineering," third edition, by F. E. Terman, McGraw-Hill, 1947. The trigger pulse generator 17 is coupled through the unit 18 to a gated sweep generator 19 which is responsive to the repetitive pulses and requires a predetermined minimum recovery time between sweeps, thus causing the radar system to have an operating phase requiring a predetermined minimum time. The output circuit of the sweep generator 19 is coupled to a deflection circuit of the plan-position indicator 16 for supplying a sweep signal to that indicator.

Units 10–13, inclusive, 15–17, inclusive, 19 and the antenna 14 may all be of conventional construction and operation so that a detailed explanation of the operation thereof is deemed unnecessary.

General operation of Fig. 1 radar system

Considering briefly, however, the operation of the Fig. 1 radar system as a whole, the synchronizing circuits 10 periodically apply to the modulator 11 trigger pulses having a repetition frequency determined by the frequency of the repetition rate oscillator of the unit 10. These trigger pulses periodically fire the modulator 11 which in turn pulse-modulates the output signal of the transmitter 12 and causes the transmitter to apply to the antenna 14 through the duplexer 13 periodic bursts of high-frequency wave-signal energy. During the operation of the transmitter 12, the duplexer 13 protects the receiver 15 from being overloaded by the transmitted pulses. During the intervals between transmitted pulses, the receiver 15 responds to any echo signals intercepted by the antenna 14, detects the modulation components of these signals and applies the detected signals to the plan-position indicator 16.

Output pulses of the modulator 11 are also applied to the trigger pulse generator 17. In response to these pulses, the trigger pulse generator 17 repetitively triggers the control system 18 which applies repetitive gating pulses to the sweep generator 19. During the gating intervals, the sweep generator 19 develops sweep signals which are applied to the deflection circuit of the plan-position indicator 16 to deflect the cathode-ray beam of the indicator 16 in a usual manner to develop on the screen thereof a plan view of the area being scanned by the radar apparatus.

Description of Fig. 1 control system

Referring now more particularly to the unit 18 of the Fig. 1 radar system, that unit comprises a system, specifically a gating pulse generator system, for automatically varying the duration of repetitive pulses in response to variations in the relative values of the duration of the repetitive pulses and the period of trigger pulses for synchronizing the source of the repetitive pulses. The gating pulse generator system comprises a circuit for supplying repetitive trigger pulses and a source of repetitive pulses, preferably having a duration variable in accordance with variations in an operating potential applied thereto and ordinarily having a variable repetition rate determined by the repetition rate of the trigger pulses. More particularly, this source of repetitive pulses comprises a triggered pulse generator 20 for generating repetitive gating pulses of substantially rectangular wave form and synchronized with the trigger pulses. Specifically, the pulse generator 20 comprises a trigger pulse amplifier 21 having an input circuit, including a low-impedance resistor 22, a coupling condenser 23, a grid-leak resistor 24 and a suitable source of negative bias —B, which couples the trigger pulse generator 17 to the control electrode-cathode circuit of the amplifier 21 to supply the trigger pulses thereto. The triggered pulse generator 20 also includes a multivibrator of the "one-shot" type comprising a normally nonconductive tube 25 and a normally conductive tube 26. The anode-cathode circuit of the tube 25 is coupled to the control electrode-cathode circuit of a cathode-follower tube 51 having a cathode resistor 52 connected to a suitable source of negative potential —B′ while the anode of the tube 51 is connected to a suitable source of positive potential +B. The cathode of the tube 51 is coupled to the control electrode-cathode circuit of the tube 26 through a coupling condenser 31 and a conventional grid-leak and biasing network comprising resistors 27, 28, 29, an adjustable resistor 30 and the source of negative potential —B′. The control electrode of the tube 25 is directly coupled to the anode of the tube 26 which is coupled through a load resistor 32 to the source +B. The cathode of the tube 26 is connected to the source —B′ which is selected together with the source +B, the tube 26 and the resistor 32 to provide a suitable negative operating bias for the tube 25.

The gating pulse generator system also includes a circuit responsive to the repetitive pulses and the trigger pulses for deriving therefrom a control signal representative of the time interval between the termination of each repetitive pulse and the succeeding trigger pulse. More particularly, the responsive circuit includes an integrating circuit coupled to the source of repetitive gating pulses for developing from those pulses, pulses having predetermined rise and decay times and for additively combining the developed pulses and the trigger pulses to derive therefrom a signal having a peak amplitude representative of the termination of each repetitive pulse and the succeeding trigger pulse. Specifically, the integrating circuit comprises resistors 35 and 36 and a condenser 37 and ordinarily has rise and decay time constants which are approximately the same. The integrating circuit is coupled to the anode-cathode circuit of the tube 26 through a resistor 50 and a parallel-connected coupling condenser 33 and a suitable buffer amplifier 34 which preferably is a two-stage amplifier.

The responsive circuit described above also includes a peak-rectifying circuit responsive to each trigger pulse occurring before the complete decay of one of the above-mentioned developed pulses for rectifying the signal derived by the integrating circuit 35—37 having a peak amplitude representative of the aforesaid time interval between the termination of each repetitive gating pulse and the succeeding trigger pulse to derive therefrom a unidirectional control signal. Specifically, the peak-rectifying circuit comprises a normally nonconductive electron tube 38 which is rendered conductive by the repetitive grating pulses and the trigger pulses to develop the control signal. The control electrode-cathode circuit of the tube 38 is coupled to the output circuit of the buffer amplifier 34 through a cathode resistor 53, a source of negative potential —B′′′ and through the resistors 35 and 36 and a voltage divider 40 coupled to the resistor 36 and tapped across a source of negative bias potential, such as a battery 39. The anode of the tube 38 is connected to an intermediate point of a voltage divider circuit comprising resistors 41 and 42 connected between +B and —B′′ and is directly connected to the control electrode of a cathode-follower tube 43 provided with a filter condenser 44. The anode of the tube 43 is connected to the source +B and the cathode of the tube is connected to the source —B′ through a cathode load resistor 45 across which the above-mentioned control signal is derived.

The gating pulse generator system also includes a circuit for applying the control signal derived as described above to the source of repetitive pulses to vary the duration of the repetitive pulses in response to variations in the aforesaid time interval between the termination of each repetitive pulse and the succeeding trigger pulse to maintain that time interval greater than the predetermined minimum recovery time. This circuit comprises a feed-back circuit coupled between the source of repetitive gating pulses 20 and the responsive circuit comprising the buffer amplifier 34, the integrating circuit 35—37, the tube 38 and the cathode-follower tube 43, for applying the control signal as the above-mentioned operating potential to the source 20 to reduce the duration of the repetitive gating pulses in response to reductions in the time interval between each gating pulse and the succeeding trigger pulse. Specifically, the feed-back circuit comprises the conductor 46 connected between the cathode of the tube 43 and the anodes of the tubes 21 and 25 through an anode load resistor 47.

Operation of Fig. 1 control system

The operation of the gating pulse generator system 18 may best be understood by referring to the curves of Fig. 2 which represent the amplitude-time and potential-time characteristics of various units of the Fig. 1 receiver under two sets of operating conditions. Curve A of Fig. 2 represents the repetitive trigger pulses applied to the unit 18 by the trigger pulse generator 17 under such operating conditions that the trigger pulses have a relatively low repetition rate, for example approximately 150 pulses per second. The repetition rate of these pulses is determined by the operating frequency of the repetition rate oscillator included in the synchronizing circuits 10 and may be adjustable over a relatively wide range, for example from 100 cycles per second to 2,000 cycles per second. These trigger pulses are applied as positive pulses to the input circuit of the amplifier 21 wherein they are amplified and applied as negative pulses to the cathode-follower tube 51 and then to the control electrode-cathode circuit of the normally conductive tube 26 periodically to render that tube nonconductive.

The application of a trigger pulse to the control electrode of the tube 26 causes the anode potential of that tube to rise sufficiently to render conductive the normally nonconductive tube 25. The resulting decrease in the anode potential of the tube 25 is applied to the control electrode of the tube 26 by the cathode-follower tube 51 and resistor 52 and by the resistor-condenser network 27—31 to maintain the tube 26 in a nonconductive condition for a period determined by the time constant of the network, by the bias applied to the control electrode-cathode circuit from the source —B' and by the anode potential of the tube 25. During the period that the tube 26 is nonconductive, the condenser 31 charges in an interval determined by the time constant just mentioned and by the anode potential of the tube 25 until the control-electrode potential of the tube 26 rises sufficiently to allow that tube again to conduct. The anode and control-electrode signals developed by the tubes 25 and 26 are the usual signals developed by a multivibrator of this type. The signal developed at the anode of the tube 25 is represented by curve B as comprising repetitive negative pulses, the first pulse thereof having a duration extending over the time interval $t_0$–$t_2$. Curve C represents the signal developed at the control electrode of the tube 26, which comprises negative pulses of approximately trapezoidal wave shape, such as the first pulse extending over the time interval $t_0$–$t_2$. The signal developed in the anode circuit of the tube 26 comprises repetitive positive pulses as represented by curve D. The durations of these pulses may initially be selected by adjustment of the adjustable resistor 30 which controls the bias applied to the control electrode of the tube 26.

The signal represented by curve D is applied to the buffer amplifier 34 which develops approximately the same signal in the output circuit of the amplifier but isolates the integrating circuit 35—37 from the pulse generator 20. The signal represented by curve D then is applied by the buffer amplifier 34 as a gating signal to the gated sweep generator 19, causing that generator to generate during each gating interval corresponding to each positive pulse of curve D a sweep signal for application to the plan-position indicator 16 to deflect the cathode-ray beam of that indicator.

The signal represented by curve D also is applied by the amplifier 34 to the integrating circuit 35—37 to develop across the resistor 36 pulses having predetermined rise and decay times. Additionally, the trigger pulses represented by curve A are applied to the resistor 36 through the condenser 37 which serves as a coupling condenser for those pulses. The integrating circuit thus develops across the resistor 36 from the trigger pulses and the gating pulses combined pulses having predetermined rise and decay times as represented by curve E. The first of these combined pulses has a rise time extending over the interval $t_0$–$t_1$ and a decay time extending over the interval $t_2$–$t_4$. It will be noted that each trigger pulse occurs at the initiation of the corresponding pulse developed from the gating signal represented by curve D.

The direct-current bias applied to the inner control electrode of the tube 38 and represented by a broken reference line $P_1$ preferably is so selected by adjustment of the voltage divider 40 that the peak amplitude of the signal represented by curve E is insufficient to drive the tube 38 into conduction under the assumed operating condition. Accordingly, the cutoff bias of the tube 38 is represented by a broken line $P_2$ as being a more positive potential than the peak of the signal represented by curve E. The anode potential of the tube 38, and thence the unidirectional potential developed across the condenser 44 and the control-electrode potential of the cathode follower 43, then is determined by the relative magnitudes of the sources +B and —B" and the resistors 41 and 42. The potential developed at the cathode of the cathode follower 43 in response to the control-electrode potential thereof is applied as an anode-supply control potential to the anode circuits of the tubes 21 and 25. It will be understood that since the repetition rate is low, the interval $t_2$–$t_{01}$ between gating pulses is very much greater than the predetermined minimum recovery time $t_2$–$t_3$ of the gating pulse generator system 18 and sweep generator 19 which may, for example, be approximately 125 microseconds.

Considering now the operation of the gating pulse generator system 18 when the radar system operates with a much higher repetition rate, such as approximately 450 pulses per second, curve $A_1$ represents the trigger pulses developed by the trigger pulse generator 17 operating at this higher repetition rate. Under such operating conditions, if the gating pulses were of the same duration as the pulses represented by curve D, the second trigger pulse of curve $A_1$ would occur within the recovery time $t_2$–$t_3$ and before the full decay of the signal represented by curve E, as is apparent in the drawings. The sweep generator 19 could not then fully recover between sweeps and, hence, the display of the radar system would become visibly unstable.

The gating pulse generator system 18, however, responds to the trigger pulses represented by curve $A_1$ in such a manner as to prevent an unstable display. To this end, the triggered pulse generator 20 responds to the trigger pulses represented by curve $A_1$ in much the same manner as that generator responds to the pulses represented by curve A. Accordingly, curves $B_1$, $C_1$, and $D_1$ represent the signal developed at the anode of the tube 25, the signal developed at the control electrode of the tube 26 and the signal developed at the anode of the tube 26, respectively. It will be noted, however, that the periods of these three signals are substantially less than the periods of the corresponding signals represented by curves B, C and D and that the amplitudes of the signals represented by curves $B_1$ and $C_1$ are substantially less than the amplitudes of the signals represented by curves B and C. This is because the control potential applied by the cathode follower 43 to the anode circuits of the tubes 21 and 25 is substantially less under the new operating conditions for reasons presently to be explained. Since the anode potential of the tubes 21 and 25 is greatly reduced, the time required for the condenser 31 to charge and hence the duration of each gating pulse is reduced. Since the signal represented by curve $D_1$ now has a shorter period between gating pulses, the condenser 37 does not completely discharge between gating intervals and the signal developed across the resistor 36 and represented by curve $E_1$ rises from a minimum potential $P_3$ somewhat above the minimum potential $P_1$ of the signal represented by curve E.

Because of the higher repetition rate of the trigger pulses represented by curve $A_1$, each trigger pulse occurs before the complete decay of one of the pulses developed across the resistor 36 from the gating signal represented by curve $D_1$ to initiate the rise of the succeeding developed pulse. Accordingly, the trigger pulses when additively combined with the pulses derived from the gating signal represented by curve $D_1$ have sufficient amplitude periodically to render conductive the tube 38, causing a periodic discharge of condenser 44 and a reduction in the average anode potential of tube 38. The condenser 44 then maintains a smaller average unidirectional potential at the control electrode of the tube 43 and hence a smaller unidirectional control potential is applied by the cathode follower 43 to the anode circuits of the tubes 21 and 25 to control the operation of those tubes in the manner just explained. Because of the decreased length of the gating pulses represented by curve D₁, a time interval greater than the predetermined minimum recovery time is maintained between gating pulses to allow the full recovery of the gating pulse generator system 18 and the sweep generator 19.

It will be understood that when the gated pulses are lengthened, as by adjustment of the adjustable resistor 30, the gating pulse generator system 18 operates in a manner similar to that just explained to maintain a time interval between the termination of each gating pulse and the succeeding trigger pulse greater than the predetermined minimum recovery time, since the gating pulse generator system responds to variations in the relative values of the duration of the gating pulses and the period of the trigger pulses. The recovery time allowed while the system operates at a predetermined repetition rate may initially be selected by adjustment of the voltage divider 40, which controls the bias applied to the control electrode-cathode circuit of the tube 38.

While applicant does not wish to be limited to any particular circuit constants, the following have been employed in a system constructed in accordance with the circuit of Fig. 1:

| | |
|---|---|
| Tube 21 | ½ section of Type 12AU7. |
| Tube 25 | ½ section of Type 12AU7. |
| Tube 26 | ½ section of Type 12AU7. |
| Tube 38 | Type 6AQ5. |
| Tube 43 | ½ section of Type 12AU7. |
| Tube 51 | 2 parallel-connected sections of Type 12AU7. |
| Resistor 22 | 18 kilohms. |
| Resistor 24 | 100 kilohms. |
| Resistor 27 | 1.8 megohms. |
| Resistor 28 | 82 kilohms. |
| Resistor 29 | 27 kilohms. |
| Resistor 30 | 250 kilohms (max.). |
| Resistor 32 | 50 kilohms. |
| Resistor 35 | 400 kilohms |
| Resistor 36 | 550 kilohms. |
| Resistor 40 | 50 kilohms. |
| Resistor 41 | 470 kilohms. |
| Resistor 42 | 3.9 megohms. |
| Resistor 45 | 270 kilohms. |
| Resistor 47 | 22 kilohms. |
| Resistor 50 | 330 kilohms. |
| Resistor 52 | 82 kilohms. |
| Resistor 53 | 220 ohms. |
| Condenser 23 | 150 micromicrofarads. |
| Condenser 31 | 2200 micromicrofarads. |
| Condenser 33 | 22 micromicrofarads. |
| Condenser 37 | 680 micromicrofarads. |
| Condenser 44 | 1 microfarad. |
| Source +B | 220 volts. |
| Source −B | −30 volts. |
| Source −B′ | −180 volts. |
| Source −B″ | −350 volts. |
| Source −B‴ | −60 volts. |
| Battery 39 | −350 volts. |

From the foregoing description of the invention it will be apparent that a gating pulse generator system 18 constructed in accordance with the invention has the advantage that the system automatically varies the duration of the gating pulses developed thereby in response to variations in the relative values of the duration of the gating pulses and the period of trigger pulses which synchronize the source of the gating pulses 20.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radar system including a source of trigger pulses for synchronizing a source of repetitive gating pulses and including a gated circuit responsive to said gating pulses and requiring a predetermined minimum recovery time between gating intervals, a gating-pulse generator system for automatically varying the duration of the gating pulses in response to variations in the relative values of the duration of the gating pulses and the period of the trigger pulses comprising: a circuit for supplying trigger pulses; a multivibrator coupled to said circuit for generating repetitive gating pulses having a duration variable in accordance with variations in an operating potential applied thereto and having a repetition rate determined by the repetition rate of said trigger pulses; an integrating circuit coupled to said multivibrator for deriving from said gating pulses pulses having predetermined rise and decay times and coupled to said supply circuit for additively combining said derived pulses and said trigger pulses to develop therefrom a signal having a peak amplitude representative of the time interval between the termination of each gating pulse and the succeeding trigger pulse; a peak-rectifying circuit coupled to said integrating circuit for rectifying said developed signal to derive therefrom a unidirectional control signal representative of said time interval; and a feed-back circuit coupled between said peak-rectifying circuit and said multivibrator for applying said control signal as said operating potential to said multivibrator to vary the duration of said gating pulses in response to variations in said time interval to maintain said time interval greater than said predetermined minimum recovery time.

2. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses; a source of repetitive pulses of a variable duration coupled to said circuit and having a repetition rate determined by the repetition rate of said trigger pulses; a circuit responsive jointly to said repetitive pulses and said trigger pulses for deriving therefrom a control signal representative of the time interval between the termination of each repetitive pulse and the succeeding trigger pulse; and a circuit for applying said control signal to said source of said repetitive pulses to vary the duration thereof in response to variations in said time interval to maintain said time interval greater than said predetermined minimum time.

3. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses of adjustable repetition rate; a multivibrator coupled to said circuit for generating repetitive pulses having a duration variable in accordance with variations in an operating potential applied thereto and having a repetition rate determined by the repetition rate of said trigger pulses; a circuit responsive jointly to said repetitive pulses and said trigger pulses of said adjustable repetition rate for developing therefrom a control signal representative of the time interval between the termination of each repetitive pulse and the succeeding trigger pulse; and a circuit for applying said control signal as said operating potential to said source of said repetitive pulses to vary the duration thereof in response to variations in said time interval to maintain said time interval greater than said predetermined minimum time.

4. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses of adjustable repetition rate; a source of repetitive pulses of a variable duration coupled to said circuit and having a repetition rate determined by the repetition rate of said trigger pulses; a circuit for combining said repetitive pulses and said trigger pulses of said adjustable repetition rate to derive therefrom a signal having a peak amplitude representative of the time interval between the termination of each repetitive pulse and the succeeding trigger pulse; and a circuit for varying an operating potential of said source of said repetitive pulses in accordance with said peak amplitude to vary the duration of said repetitive pulses in response to variations in said time interval to maintain said time interval greater than said predetermined minimum time.

5. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses; a source of repetitive pulses of a variable duration coupled to said circuit and having a repetition rate determined by the repetition rate of said trigger pulses; a circuit for combining said repetitive pulses and said trigger pulses to derive therefrom a signal having a peak amplitude representative of the time interval between the termination of each repetitive pulse and the succeeding trigger pulse; a peak-rectifying circuit coupled to said combining circuit for rectifying said derived signal to develop a control signal; and a circuit for applying said control signal to said source of said repetitive pulses to vary the duration thereof in response to variations in said time interval to maintain said time interval greater than said predetermined minimum time.

6. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses; a source of repetitive pulses of a variable duration coupled to said circuit and having a repetition rate determined by the repetition rate of said trigger pulses; an integrating circuit coupled to said source of repetitive pulses for deriving from said repetitive pulses pulses having predetermined rise and decay times; a circuit responsive to each trigger pulse occurring before the complete decay of one of said derived pulses for deriving therefrom a control signal representative of the time interval between the termination of each repetitive pulse and the succeeding trigger pulse; and a circuit for applying said control signal to said source of said repetitive pulses to vary the duration thereof in response to variations in said time interval to maintain said time interval greater than said predetermined minimum time.

7. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses; a source of repetitive pulses of a variable duration coupled to said circuit and having a repetition rate determined by the repetition rate of said trigger pulses; a normally nonconductive electron tube; a circuit for applying said repetitive pulses and said trigger pulses to said tube for rendering it conductive and a tube output circuit for deriving from said pulses a unidirectional control signal representative of the time interval between the termination of each repetitive pulse and the succeeding trigger pulse; and a circuit for applying said control signal to said source of said repetitive pulses to vary the duration thereof in response to variations in said time interval to maintain said time interval greater than said predetermined minimum time.

8. In a system including a source of trigger pulses for synchronizing a source of repetitive pulses and having an operating phase requiring a predetermined minimum time, a control system for automatically varying the duration of the repetitive pulses in response to variations in the relative values of the duration of the repetitive pulses and the period of the trigger pulses comprising: a circuit for supplying trigger pulses; a source of repetitive pulses of a variable duration coupled to said circuit and having a repetition rate determined by the repetition rate of said trigger pulses; a circuit responsive jointly to said repetitive pulses and said trigger pulses for developing therefrom a control signal representative of the time interval between the termination of each repetitive pulse and the succeeding trigger pulse; and a feed-back circuit coupled between said responsive circuit and said source of repetitive pulses for applying said control signal to said source of said repetitive pulses to vary the duration thereof in response to variations in said time interval to maintain said time interval greater than said predetermined minimum time.

References Cited in the file of this patent

UNITED STATES PATENTS

| | | |
|---|---|---|
| 2,491,029 | Brunn | Dec. 13, 1949 |
| 2,557,536 | MacNichol | Dec. 4, 1951 |
| 2,617,984 | Coykendall | Nov. 11, 1952 |